US012802720B2

(12) United States Patent
Kim

(10) Patent No.: US 12,802,720 B2
(45) Date of Patent: Nov. 17, 2026

(54) METHOD OF RECORDING AND REPRODUCING A VEHICLE IMAGE USING METADATA AND SYSTEM FOR THE SAME

(71) Applicants: Hyundai Motor Company, Seoul (KR); Kia Corporation, Seoul (KR)

(72) Inventor: Kyoung Jun Kim, Hwaseong (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 26 days.

(21) Appl. No.: 18/819,164

(22) Filed: Aug. 29, 2024

(65) Prior Publication Data

US 2025/0118334 A1 Apr. 10, 2025

(30) Foreign Application Priority Data

Oct. 4, 2023 (KR) ........................ 10-2023-0131475

(51) Int. Cl.
*H04N 5/92* (2006.01)
*G11B 27/00* (2006.01)
*H04N 5/91* (2006.01)

(52) U.S. Cl.
CPC ............. *G11B 27/005* (2013.01); *H04N 5/91* (2013.01)

(58) Field of Classification Search
CPC ............... H04N 5/91; H04N 5/92; G11B 7/00
USPC ......................... 386/239, 248, 278, 282, 280
See application file for complete search history.

(56) References Cited

U.S. PATENT DOCUMENTS

2005/0207733 A1* 9/2005 Gargi .................. G11B 27/105 386/E5.052
2013/0336638 A1* 12/2013 Fork ...................... H04N 5/765 386/278
2018/0041820 A1* 2/2018 Xu ..................... H04N 21/8549
2023/0349709 A1* 11/2023 Nagata ............. G08G 1/096844

* cited by examiner

*Primary Examiner* — Daquan Zhao
(74) *Attorney, Agent, or Firm* — Fox Rothschild LLP

(57) ABSTRACT

A method of recording videos of a vehicle using metadata, a method of playing videos, and a system include obtaining a video from at least one camera built into a vehicle, obtaining information on a state of the vehicle and converting the information into metadata to be added to the video, and generating a source video for recording by adding the metadata to the video.

7 Claims, 5 Drawing Sheets

METHOD OF RECORDING AND REPRODUCING A VEHICLE IMAGE USING METADATA AND SYSTEM FOR THE SAME

CROSS-REFERENCE TO RELATED APPLICATION

The present application claims under 35 U.S.C. § 119(a) the benefit of Korean Patent Application No. 10-2023-0131475, filed on Oct. 4, 2023, the entire contents of which is incorporated by reference herein.

BACKGROUND

(a) Technical Field

The present disclosure relates to a method of recording videos of a vehicle using metadata, a method of playing the videos, and a system therefor.

(b) Description of the Related Art

An event data recorder (hereinafter, referred to as "EDR"), also known as a dashcam, is an apparatus that records videos of situations inside and outside a vehicle when the vehicle is running or parked, and is a convenience apparatus that may record a collision or event and provide information necessary to determine the circumstances of the collision or event.

Previously an EDR was mounted only on the exterior of vehicles, but now may be built into vehicles before they are shipped.

A built-in EDR typically is more useful than an external EDR in that it allows access to a host vehicle's driving data and connection with other controllers (for example, it checks the speed of the vehicle and whether the seat belts are worn, performs multiple functions including functions of a navigation system and Hi-pass, which is a system that allows drivers to make wireless toll payments in the expressways in South Korea, and generates a signal to request emergency rescue in an emergency situation).

In addition, the camera for obtaining videos of the external EDR only focuses on the front of a vehicle, but the built-in EDR provides various options of one channel (focusing on the front), two channels (focusing on the front and the rear), and four channels (focusing on the front, the rear, the left, and the right) according to a user's choice, i.e., the number of cameras, and the multi-channel EDR is drawing much attention in consideration of autonomous driving.

However, when applying the conventional technology for playing a recorded video, it is only possible to play a video at a regular or double speed from the beginning to the end of the video. Therefore, when a user wants to examine an event that has occurred while a vehicle is driving or parked but does not know the exact time of the event, they need to check the entire recorded video, which is inconvenient and takes a long time.

Moreover, when all videos obtained through multiple channels are to be checked, more time and effort are required.

In addition, a progress bar can be used to study a video, but a desired scene may not be captured because not all frames are shown sequentially without missing frames.

By the conventional method of recording videos, a video is recorded in uniform recording quality, that is, in high or low quality, so when the video is recorded in low quality considering memory capacity and therefore not clear, controversy may arise when an event occurs. On the other hand, it is pointed out that memory capacity may not be sufficient when a video is recorded in high quality to prevent such controversy.

Consequently, there has been a demand for the development of technology for recording important moments including events in high quality and everyday moments in low quality and playing back the everyday moments in low quality at a high speed and the important moments including events in high quality at a regular or low speed.

The information included in this Background of the present disclosure section is only for enhancement of understanding of the general background of the present disclosure and may not be taken as an acknowledgement or any form of suggestion that this information forms the prior art already known to a person skilled in the art.

SUMMARY

The present disclosure provides a method of recording videos of a vehicle using metadata, a method of playing the videos, and a system therefor, where information on the state of a vehicle converted into metadata is synchronized with a video obtained by a camera to be recorded and stored, important moments including events are distinguished from ordinary moments by applying weights based on the metadata, the important moments including events are recorded in high quality while the everyday moments are recorded in low quality, and the everyday moments in low quality are played at a high speed while the important moments including events in high quality are played at a regular or low speed.

A method of recording videos of a vehicle using metadata according to the present disclosure may include obtaining, by a controller, a video from at least one camera; obtaining, by the controller, information on a state of the vehicle and converting it into metadata; and generating, by the controller, a source video by adding the metadata to the video.

The method may further include recording the source video by dividing the source video into a plurality of sections including a first section and a second section by applying weights based on the metadata.

In at least one embodiment of the present disclosure, a section corresponding to a weight equal to or greater than a preset threshold is classified as the first section.

The recording may further include applying different recording resolutions to the first section and the second section.

The information on the state of the vehicle may include information on a speed of the vehicle, a sudden acceleration, a sudden deceleration, a sharp turn, a wheel slip, an evasive maneuver, or an event occurrence.

The applying of the weights may include dividing the source video into sections by a preset unit time, and determining, based on the information on the state of the metadata for each section divided by the unit time, any one of values in a range of zero to nine.

The unit time may be in a range of 10 msec. to 1 sec.

A method of playing videos of a vehicle using metadata according to the present disclosure may include playing a recorded video of a source video generated by adding metadata obtained by converting information on a state of a vehicle to a video obtained by at least one camera, and may include analyzing the metadata, applying weights for playback to the video based on the metadata, dividing the video into a plurality of sections including at least a first section and a second section based on the weights for playback, and playing back the first section and the second section differently. The method may be carried out using a controller.

The playing back of the first and second sections differently may include playing the second section at a speed higher than a speed at which the first section is played.

In the playing back of the first and second sections differently, the second section may be played at a speed 2 to 5 times higher than a regular speed.

In the playing back of the first and second sections differently, the first section may be played at a speed 1 to 1.5 times lower than a regular speed.

A method of playing videos of a vehicle using metadata according to the present disclosure may include playing a recorded video of a source video generated by adding metadata obtained by converting information on a state of a vehicle to a video obtained by at least one camera and then dividing the source video into a first section and a second section by applying weights based on the metadata, and may include playing back the first section and the second section differently. The method may be carried out using a controller.

The playing back of the first and second sections differently may include playing the second section at a speed relatively higher than a speed at which the first section is played.

In the playing back of the first and second sections differently, the second section may be played at a speed 2 to 5 times higher than a regular speed.

In the playing back of the first and second sections differently, the first section may be played at a speed 1 to 1.5 times lower than a regular speed.

The playing back of the first and second sections differently may further include playing back only the first section.

A system for recording videos of a vehicle according to the present disclosure may include a camera video processing module of a controller configured to store and manage videos obtained by at least one camera, a metadata generation module of the controller configured to convert information on the state of a vehicle into metadata and provide it to the camera video processing module, and a video recording module of the controller configured to receive the video containing the metadata from the camera video processing module, record the video by dividing the video into a plurality of sections including at least a first section and a second section by applying weights based on the metadata, and output the video by differentially applying recording quality or playback speed to the first section and the second section.

A vehicle may include the above-described system for recording videos of the vehicle.

Through the method of recording videos of a vehicle using metadata, the method of playing the videos, and the system therefor, it may be possible to play back a recorded video in relatively less important sections at a high speed and in important sections thereof at a regular or low speed, allowing a user to examine the video in a convenient and effective way. That is, it may be possible to enable the user to examine the video quickly and check the section of interest of the video in the full context by playing back the entire video to the user.

In addition, by differentially applying recording quality during recording, it may be possible to record videos in relatively less important sections in low quality and in important sections in high quality, significantly reducing memory consumption compared to recording the videos in uniform quality.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
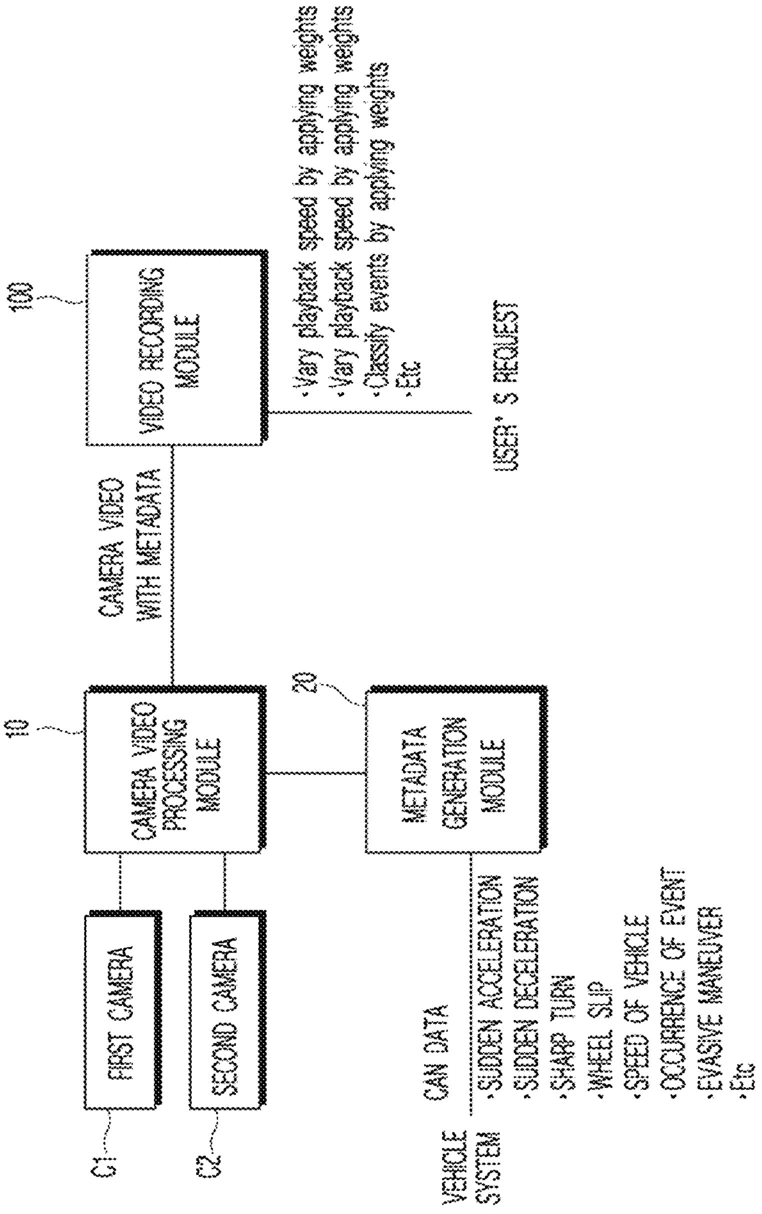
FIG. 1 is a block diagram for showing components of a system for recording videos of a vehicle using metadata according to an embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, will be determined in part by the particularly intended application and use environment.

In the figures, the same reference numerals refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Because various changes can be made to the present disclosure and a range of embodiments can be made for the present disclosure, specific embodiments will be illustrated and described in the drawings. However, this is not intended to limit the present disclosure to the specific embodiments, and it should be understood that the present disclosure includes all changes, equivalents, and substitutes within the technology and the scope of the present disclosure.

The terms "module" and "unit" used in the present disclosure are merely used to distinguish the names of components, and should not be interpreted as assuming that the components have been physically or chemically separated or can be so separated.

Terms containing ordinal numbers such as "first" and "second" may be used to describe various components, but the components are not limited by the terms. The above-mentioned terms can be used only as names to distinguish one component from another component, and the order therebetween can be determined by the context in the descriptions thereof, not by such names.

The expression "and/or" is used to include all possible combinations of multiple items being addressed. For example, by "A and/or B," all three possible combinations are meant: "A," "B," and "A and B."

When a component is said to be "coupled" or "connected" to another component, it means that the component may be directly coupled or connected to the other component or there may be other components therebetween.

The terms used herein are only used to describe specific embodiments and are not intended to limit the present disclosure. Expressions in the singular form include the meaning of the plural form unless they clearly mean otherwise in the context. In the present disclosure, expressions such as "comprise" or "have" are intended to indicate the presence of features, numbers, steps, operations, components, parts, or combinations thereof described herein, and should not be understood as precluding the possibility of the presence or the addition of one or more other features, numbers, steps, operations, components, parts, or combinations thereof.

Unless otherwise defined, all terms used herein, including technical or scientific terms, have meanings commonly understood by a person having ordinary skill in the technical field to which the present disclosure pertains. Terms defined in commonly used dictionaries should be interpreted as having meanings consistent with the meanings they have in the context of the relevant technology, and should not be interpreted in an ideal or overly formal sense unless explicitly defined in the present disclosure.

In addition, a unit, a control unit, a control device, or a controller is only a term widely used to name devices for controlling a certain function, and do not mean a generic function unit. For example, devices with these names may include a communication device that communicates with other controllers or sensors to control a certain function, a computer-readable recording medium that stores an operating system, logic instructions, input/output information, etc., and one or more processors that perform operations of determination, calculation, making decisions, etc. required to control the function.

Meanwhile, the processor may include a semiconductor integrated circuit and/or electronic devices that carry out operations of at least one of comparison, determination, calculation, and making decisions to perform a programmed function. For example, the processor may be any one or a combination of a computer, a microprocessor, a CPU, an ASIC, and an electronic circuit such as circuitry and logic circuits.

Examples of a computer-readable recording medium (or simply called a memory) may include all types of storage devices for storing data that can be read by a computer system. For example, they may include at least one of a memory such as a flash memory, a hard disk, a micro memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

Such a recording medium may be electrically connected to the processor, and the processor may load and write data from the recording medium. The recording medium and the processor may be integrated or may be physically separate.

Hereinafter, a method of recording videos of a vehicle using metadata, a method of playing the videos, and a system therefor according to the present disclosure will be described with reference to the attached drawings.

FIG. 1 is a block diagram for showing components of a system for recording videos of a vehicle using metadata according to an embodiment of the present disclosure, and the system may include a camera video processing module 10 that stores and manages videos obtained by at least one camera C1 and C2 built into a vehicle, a metadata generation module 20 that converts information on the state of the vehicle into metadata to be added to the videos obtained by the at least one camera C1 and C2 and provides it to the camera video processing module, and a video recording module 100 that receives videos obtained by the camera and containing metadata from the camera video processing module 10, differentially records important moments and everyday moments by applying weights based on the metadata, and differentially applies recording quality or playback speed depending on a user's request.

Each of the above modules may constitute devices of the vehicle, which may include one or more controllers. For example, the above modules of the vehicle may constitute hardware components that form part of a controller (e.g., modules or devices of a high-level controller), or may constitute individual controllers each having a processor and memory. The vehicle may include one or more processors and memory. As provided herein, the term "controller" will be used to refer generally to the above modules.

Here, as requested by the user, the video recording module 100 may receive the videos obtained by the camera and containing the metadata from the camera video processing module 10 and may record in uniform recording quality, may record important moments and everyday moments differentially by applying weights based on the metadata, or may vary recording quality when recording with the weights applied.

It should be noted that the module may include a memory storing programs for performing their respective functions and a processor executing the programs and that the respective memories of the modules may be integrated into one or more memories and the respective processors thereof may be integrated into one or more processors.

The varying of recording quality may mean that the weights are applied to record a video in high recording quality in a section determined to be important and record the video in low recording quality in a section determined to be ordinary.

Because most sections of a recorded video show everyday moments, when recording quality is varied as mentioned above, it may be possible to reduce the amount of stored data significantly.

In addition, it may be possible to play a recorded video through the video recording module 100. When the recorded video only contains metadata, the video recording module 100 may play the recorded video while applying weights based on the metadata as requested by a user to distinguish important moments from everyday moments, and may play videos of the everyday moments at a high speed and videos of the important moments at a regular or low speed. Therefore, when a user examines the recorded video, the video recording module 100 may play videos of relatively less important sections back to the user at a high speed and play videos of important sections back to the user at a regular or low speed, allowing the user to view the recorded video in a convenient way and in full context.

Moreover, when weights based on the metadata have been applied to the recorded video, the video recording module 100 may play the video without the process of applying weights. In addition, when the user wants to examine only videos of highlighted sections, the video recording module 100 may play only videos of important moments back to the user.

Figure 2:
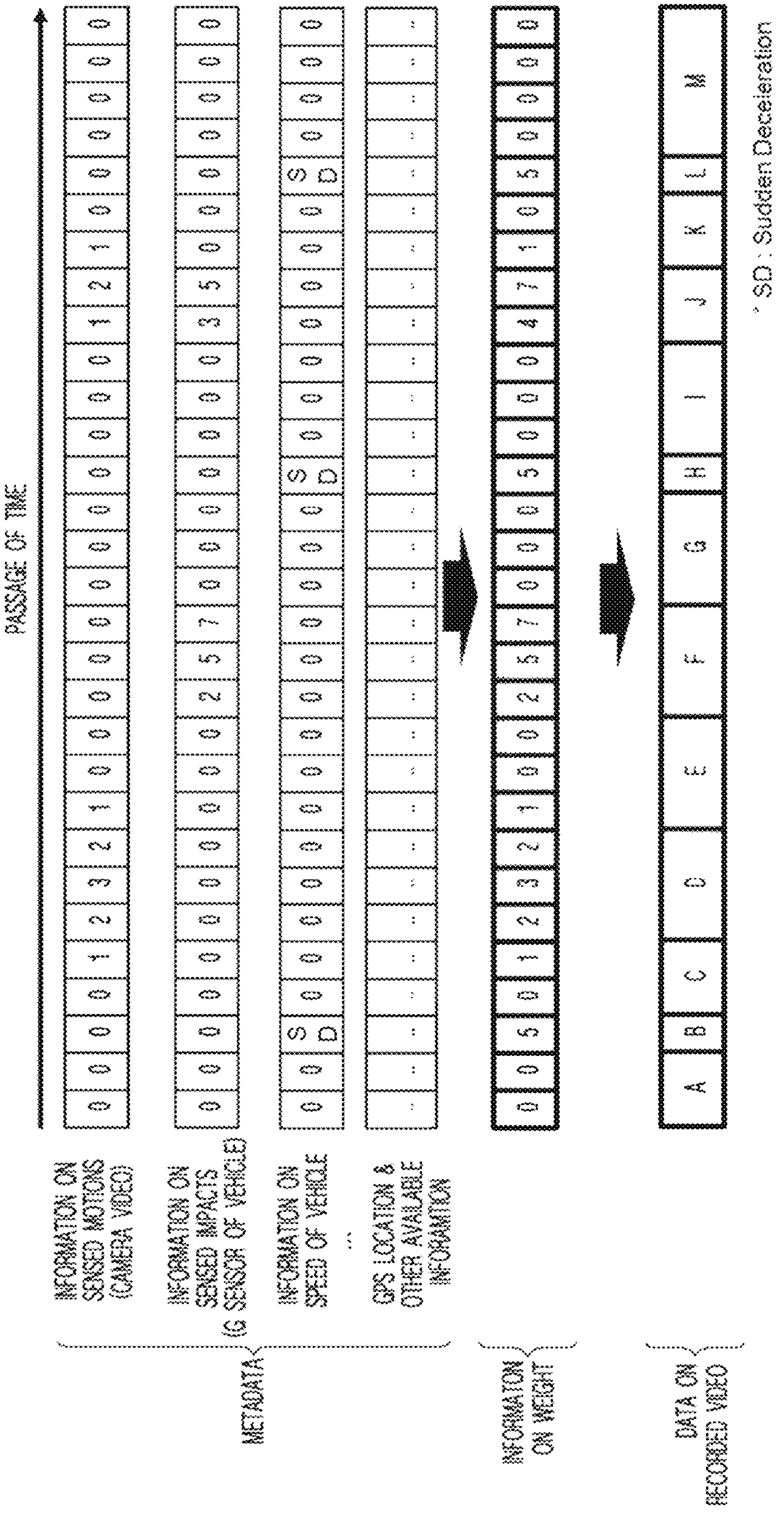
FIG. 2 is a view for illustrating how weights are applied based on metadata and a recorded video is divided according to an embodiment of the present disclosure.

The process of applying weights is shown in FIG. 2, and FIG. 2 is a view for illustrating how weights are applied based on metadata and a recorded video is divided according to an embodiment of the present disclosure.

By the weights, any source video (video recorded or played back with metadata) may be divided into sections by a preset unit time (e.g., 10 msec. to 1 sec.), and, based on the state information of the metadata of each section divided by the unit time, any one of values in a range of zero to nine may be assigned to each of the sections.

Therefore, in FIG. 2, the sections classified as ordinary sections with a weight less than a preset threshold are the sections designated as A, C, E, G, I, K, and M, and the sections classified as important sections with a weight equal to or greater than the threshold are the sections designated as B, D, F, H, J, and L.

Figure 3:
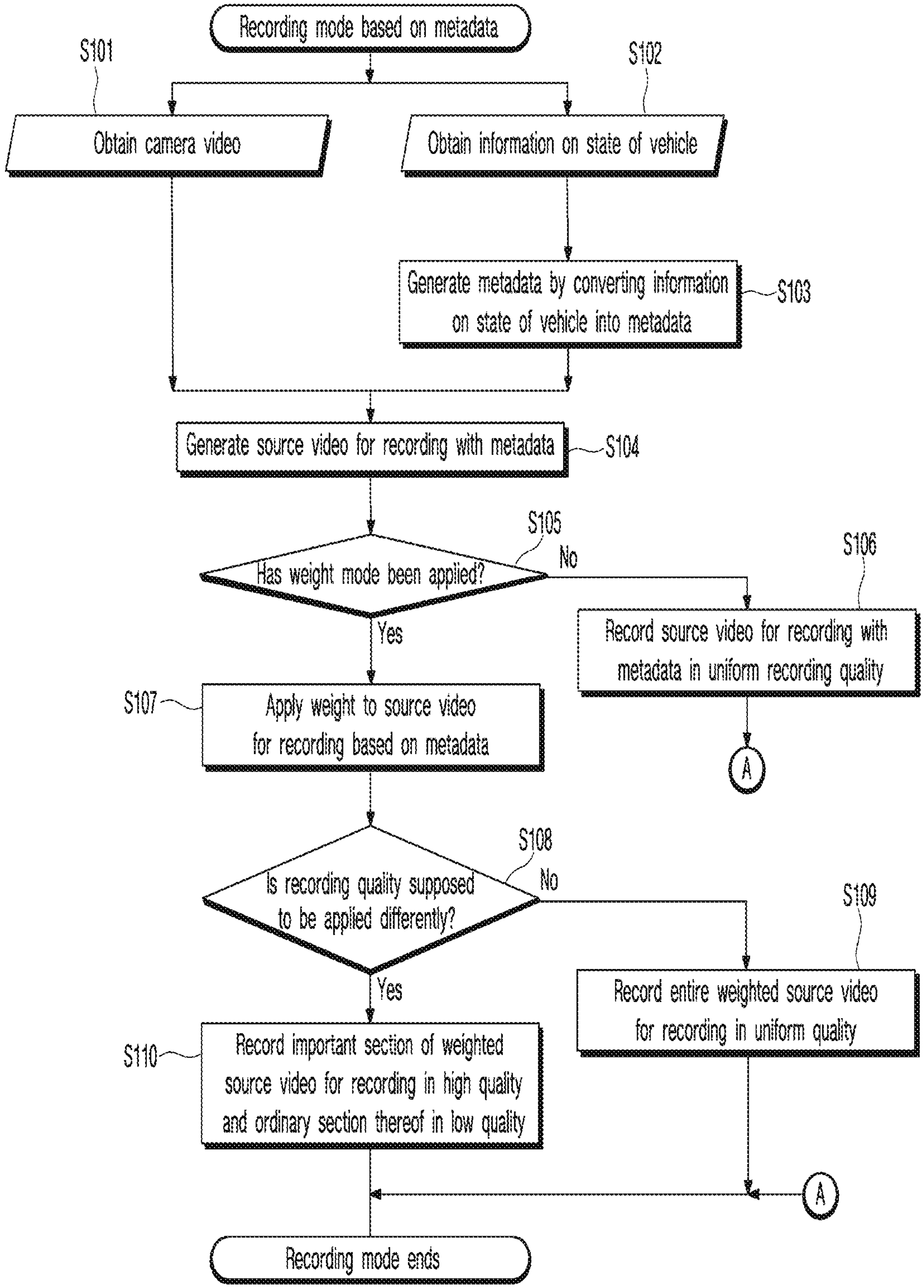
FIG. 3 is a flowchart for illustrating the process of recording videos of a vehicle using metadata according to an embodiment of the present disclosure.
Figure 4A:
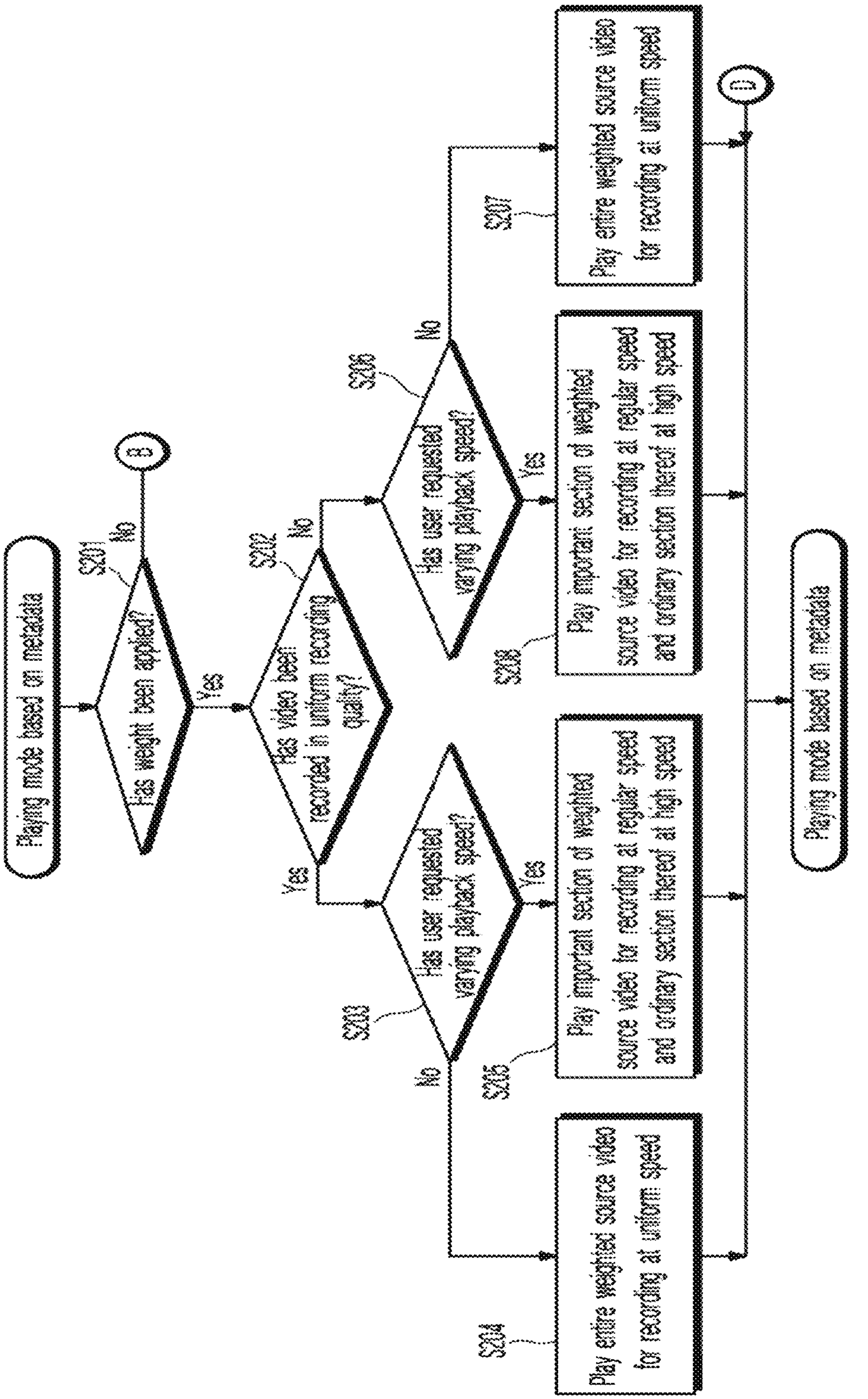
FIG. 4A and FIG. 4B are flowcharts for illustrating the process of playing videos of a vehicle using metadata according to an embodiment of the present disclosure.
Figure 4B:
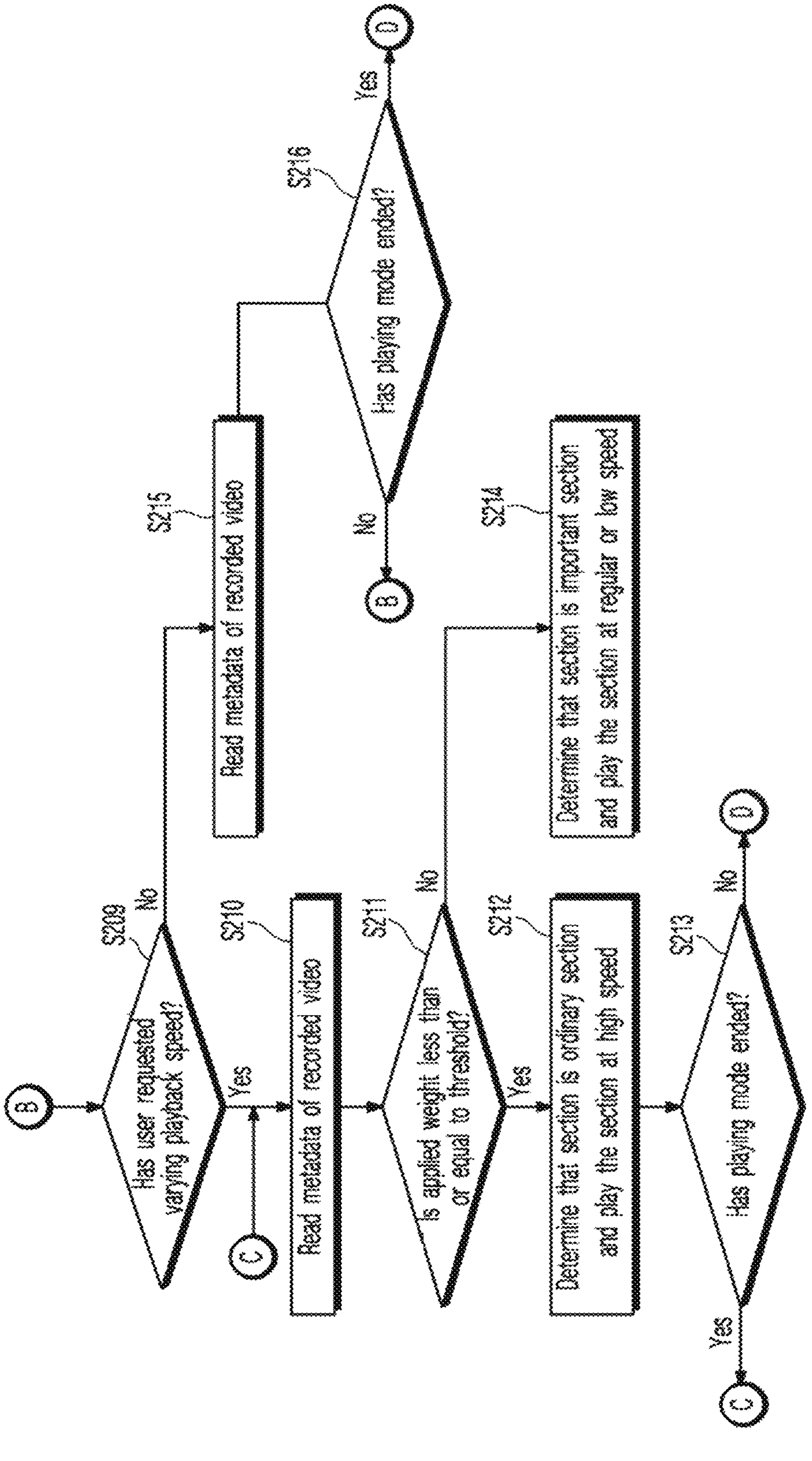

FIG. 3 is a flowchart for illustrating the process of recording videos of a vehicle using metadata according to an embodiment of the present disclosure, and FIG. 4A and FIG. 4B are a flowchart for illustrating the process of playing videos of a vehicle using metadata according to an embodiment of the present disclosure.

First, examination of the process of recording videos of a vehicle in FIG. 3 shows that a video may be obtained by at least one camera built into the vehicle at S101.

At the same time, information on the state of the vehicle may be obtained at S102 and may be converted into metadata to be added to the video at S103.

Thereafter, at S104, the metadata generated at S103 may be synchronized and mixed with the camera video obtained at S101 to generate a source video for recording with the metadata.

Afterwards, at S105, it may be determined whether a weight mode has been selected by a user. When the weight mode is not determined to have been applied, the process may proceed to S106, and the source video for recording with the metadata generated at S104 may be in uniform recording quality.

In contrast, when the weight mode is determined to have been applied at S105, the process may proceed to step S107, and weights may be applied to the source video for recording with the metadata as shown in FIG. 2.

Afterwards, at S108, it may be determined whether the user has requested varying recording quality, and, if not, the process may proceed to S109, and the entire weighted source video for recording may be in uniform recording quality.

On the other hand, when it is determined at S108 that the user has requested varying recording quality, the process may proceed to S110, and the important sections of the weighted source video for recording may be in high recording quality, and the ordinary sections thereof may be in low recording quality.

FIG. 3 briefly shows the order in which the recording mode according to the present disclosure is carried out, and it should be noted that the order is not limited thereto.

When a recorded video with metadata is to be played after the recorded video has been stored through the above-described process, it may be determined at S201 whether a weight has been applied to the video to be played.

When it is determined that a weight has been applied thereto at S201, the process may proceed to S202 to determine whether the video to be played has been recorded in recording quality differentiated based on the applied weight or in uniform recording quality.

When it is determined at S202 that the video to be played has been recorded in recording quality differentiated based on the weight, the process may proceed to S203 to determine whether the user wants to play the video at a uniform speed or at a speed differentiated based on the weight.

When it is determined at S203 that the user wants to play the video at a uniform speed, the process may proceed to S204 to play the video at a uniform speed, and the playback mode may end when the playback has been completed.

In contrast, when it is determined at S203 that the user wants to play the video at a speed differentiated based on the weight rather than a uniform speed, the process may proceed to S205 to play back the important sections of the weighted video at a regular or low speed (e.g., playback speed 1 to 1.5 times lower than a regular speed depending on the user's request) and the ordinary sections thereof at a high speed (e.g., playback speed 2 to 5 times higher than a regular speed depending on the user's request).

Accordingly, the process of S203 to S205 relates to playing back a video recorded in high quality in a section to which a weight equal to or greater than a preset threshold has been applied during the recording and in low quality in a section to which a weight less than the threshold has been applied.

Therefore, at S205, the ordinary sections of a video recorded in low quality may be played at high speed, and the important sections of the video recorded in high quality may be played at a regular or low speed.

In contrast, when it is determined that a weight has been applied to the video to be played at S202 but the video has been recorded in uniform recording quality, the process may proceed to S206 to determine whether the user wants to play the video at a uniform speed or at a speed differentiated based on the weight.

When it is determined at S206 that the user wants to play the video at a uniform speed, the process may proceed to S207 to play the video at a uniform speed, and the playback mode may end when the playback has been completed.

In contrast, when it is determined at S206 that the user wants to play the video at a speed differentiated based on the weight rather than a uniform speed, the process may proceed to S208 to play back the important sections of the weighted video at a regular or low speed (e.g., playback speed 1 to 1.5 times lower than a regular speed depending on the user's request) and the ordinary sections thereof at a high speed (e.g., playback speed 2 to 5 times higher than a regular speed depending on the user's request).

Accordingly, the process of S206 to S208 relates to playing back a video recorded in uniform recording quality in both the important and ordinary sections although a weight has been applied to the video during the recording.

In addition, when it is determined at S201 that a recorded video contains metadata but no weight has been applied to the video, the process may proceed to S209 to determine whether the user wants to play the video at a uniform speed.

When it is determined at S209 that the user wants to play the video at a variable playback speed, the process may proceed to S210 to read the metadata in the recorded video.

Afterwards, at S211, a weight may be applied based on the metadata read at S110, and, when the weight is less than a threshold, the corresponding section may be determined to be an ordinary section and played back at a high speed at S212, and it may be determined whether the playback mode has ended at S213.

When it is not determined at S213 that the playback mode has ended, the process may proceed back to S210.

In contrast, at S211, a weight may be applied based on the metadata read at S110, and, when the weight is equal to or greater that the threshold, the corresponding section may be determined to be an important section and played back at a regular or low speed at S214.

Meanwhile, when it is determined at S209 that the user has selected to play the video at a uniform speed, the process may proceed to S215 to play the video at a uniform speed without applying a weight, and it may be determined whether the playback mode has ended at S216.

FIG. 4A and FIG. 4B briefly show the order in which the playback mode according to the present disclosure is carried out, and it should be noted that the order is not limited thereto.

Therefore, it may be possible to play only important sections in a highlighted form using metadata and weights, and, for example, it may be possible to collect and play only the sections in which evasive maneuvers have been made among the sections determined to be important.

It may be possible to play back a recorded video in the relatively less important sections at a high speed and in the important sections thereof at a regular or low speed, allowing a user to examine the video in a convenient and effective way. That is, it may be possible to enable the user to examine the video quickly and check the section of interest of the video in the full context by playing back the entire video to the user.

Moreover, because recording quality may be varied depending on a weight during recording, it may be possible to save the storage space of a memory and record the important sections of a video in high recording quality.

The desirable embodiments of the present disclosure have been shown and described, but the present disclosure is not limited to the specific embodiments described above. It is needless to say that various modifications can be made to the present disclosure within the gist of the present disclosure claimed in the appended claims by a person having ordinary skill in the art, and such modifications should not be understood separately from the technology of the present disclosure.

The foregoing descriptions of the specific exemplary embodiments of the present disclosure have been presented for the purposes of illustration and description. They are not intended to be exhaustive or to limit the present disclosure to the precise forms disclosed, and obviously many modifications and variations are possible in light of the above-described teachings. The exemplary embodiments were chosen and described to explain certain principles of the present disclosure and their practical application, to enable others skilled in the art to make and utilize the various exemplary embodiments of the present disclosure, as well as various alternatives and modifications thereof. It is intended that the scope of the present disclosure be defined by the claims appended hereto and their equivalents.

What is claimed is:

1. A method of recording videos of a vehicle, the method comprising:
- obtaining, by a camera video processing module of a controller, a video from at least one camera;
- obtaining, by a metadata generation module of the controller, information on a state of the vehicle and converting the information into metadata;
- generating, by a video recording module of the controller, a source video by adding the metadata to the video;
- analyzing, by the controller, the metadata;
- applying, by the controller, weights for playback to the source video based on the metadata;
- dividing, by the controller, the source video into a plurality of sections including at least a first section and a second section based on the weights for playback; and
- playing back, by the controller, the first section and the second section differently,
- wherein the information on the state of the vehicle includes at least one of a speed of the vehicle, a sudden acceleration, a sudden deceleration, a sharp turn, a wheel slip, an evasive maneuver, or an event occurrence obtained by the controller in connection with other internal controllers of the vehicle,
- wherein the source video is generated by synchronizing and mixing the video and the metadata, and
- wherein the first section is controlled to be recorded at a first resolution higher than a second resolution at which the second section is recorded, and the first section is configured to be played back at a first speed lower than a second speed at which the second section is played back.

2. The method of claim 1, further comprising:
- recording the source video by dividing the source video into the plurality of sections including the first section and the second section by applying the weights based on the metadata.

3. The method of claim 2, wherein the applying of the weights includes dividing the source video into sections by a preset unit time, and determining, based on the information on the state of the metadata for each section divided by the unit time, any one of values in a range of zero to nine.

4. The method of claim 3, wherein the unit time is in a range of 10 msec. to 1 sec.

5. A method of playing a recorded video of a source video, the method comprising:
generating, by a controller, the source video by adding metadata obtained by converting information on a state of a vehicle to a video obtained by at least one camera;
analyzing, by the controller, the metadata;
applying, by the controller, weights for playback to the video based on the metadata;
dividing, by the controller, the video into a plurality of sections including at least a first section and a second section based on the weights for playback; and
playing back, by the controller, the first section and the second section differently,
wherein the information on the state of the vehicle includes at least one of a speed of the vehicle, a sudden acceleration, a sudden deceleration, a sharp turn, a wheel slip, an evasive maneuver, or an event occurrence obtained by the controller in connection with other internal controllers of the vehicle,
wherein the source video has a data structure in which the video and the metadata are synchronized and mixed,
wherein the first section is played back at a first speed 1 to 1.5 times lower than a regular speed, and
wherein the second section is played back at a second speed 2 to 5 times higher than the regular speed.

6. A method of playing a recorded video of a source video, comprising:
generating, by a controller, the source video by adding metadata obtained by converting information on a state of a vehicle to a video obtained by at least one camera;
dividing, by the controller, the source video into a first section and a second section by applying weights based on the metadata; and
playing back, by the controller, the first section and the second section differently,
wherein the information on the state of the vehicle includes at least one of a speed of the vehicle, a sudden acceleration, a sudden deceleration, a sharp turn, a wheel slip, an evasive maneuver, or an event occurrence obtained from internal vehicle sensors in connection with other internal controllers of the vehicle, and
wherein the first section is processed as a high-resolution recording section and played back at a first speed 1 to 1.5 times lower than a regular speed, and
wherein the second section is processed as a lower-resolution recording section and played back at a second speed 2 to 5 times higher than the regular speed.

7. The method of claim 6, wherein the playing back of the first and second sections differently further includes playing back only the first section.

* * * * *